United States Patent [19]
Goldman

[11] 4,129,749
[45] Dec. 12, 1978

[54] RADIO TELEPHONE COMMUNICATIONS SYSTEM

[76] Inventor: Stephen R. Goldman, 7435 Ruskin Rd., Philadelphia, Pa. 19151

[21] Appl. No.: 750,175

[22] Filed: Dec. 13, 1976

Related U.S. Application Data

[63] Continuation-in-part of Ser. No. 699,450, Jun. 24, 1976, abandoned.

[51] Int. Cl.² ............................................. H04Q 7/04
[52] U.S. Cl. .................................... 179/2 EB; 325/55
[58] Field of Search ....................... 179/2 EB, 15 BZ; 325/55, 64; 343/176, 177, 178

[56] References Cited

U.S. PATENT DOCUMENTS 3,840,811  10/1974  Blouch ................................. 325/55

Primary Examiner—Kathleen H. Claffy
Assistant Examiner—Joseph A. Popek
Attorney, Agent, or Firm—Stuart E. Beck

[57] ABSTRACT

A radio telephone system comprising a base station and a plurality of portable units. The base station transmits information to portable units on a first frequency and the portable units transmit information to the base station on a second frequency. Each of the frequencies is divided into a number of communications channels by time division multiplexing. In one aspect the portable units include means for detecting the calling signal assigned to a particular portable unit which calling signal is sent by the base station and to cooperate with a switch to apply signals to a gate which then energizes an alarm at the particular portable unit to indicate to a person at the portable unit that the base station is calling. In another aspect the system includes a scanner and a channel seizing means which are both coupled to the receiver of the system and to each other. The means for detecting the calling signal is connected to the scanner and seizing means and is operative in response to the tone code assigned to that particular portable unit to cause the scanner and seizing means to establish a communications channel with the base station.

14 Claims, 4 Drawing Figures

RADIO TELEPHONE COMMUNICATIONS SYSTEM

This patent application is a continuation-in-part of patent application Ser. No. 699,450 filed June 24, 1976 now abandoned.

This invention relates to a mobile communication system for receiving and transmitting computerized data, voice communication or the like between a base station and a plurality of mobile stations and more particularly to a radio telephone system comprising a multiplexed duplexer arrangement.

A system constructed in accordance with a presently preferred form of the invention may be a compact, mobile unit having an ordinary telephone handset with either a dial or pushbutton pad. Although other mobile radio telephone systems have been proposed, they have been, for the most part, of the simplex type and have been far too bulky to be readily portable. Further, they were often very complicated, thereby making them very costly and therefore commercially uneconomical.

Those systems of the duplex type were limited as to the number of individual separate simultaneous communications that they could handle because each base station and each mobile unit required its own transmitting frequency. Since there have been only a limited number of frequencies which have been allocated for this type of communication they have, over a very short period become saturated with communication. This has resulted in severly limiting the issuance of new frequency assignments, since a potential user must wait for an existing user to give up his frequency. Further, there may be more than one party using any particular assigned frequency. While this makes for efficient use of air time, private communications become impossible.

Further, in present systems a party engaged in a conversation cannot be made aware that there is a call waiting. Thus, a party may stay on an unimportant call without knowing that another call is waiting.

These problems have been alleviated to a large extent by a radio telephone communications system which can handle a large number of communications on one frequency when that frequency is divided into a number of channels by multiplexing. Thus, dividing a frequency offers a number of advantages. Among them are that the number of channels in a particular frequency is limited only by the multiplexer. Therefore there could be as many as 50 or a hundred or more channels on a given frequency depending on the frequency selected since there can be more channels at higher frequencies than at lower frequencies.

It has been recognized that with only a few frequencies hundreds of channels could be provided. This dramatically increases the number of customers who can be served by such a system. Further, with so many channels it is possible for subscribers to be assigned exclusive use of particular channels, thereby assuring the privacy of their communications.

To meet this need, time division multiplex radio telephone systems have been developed. However, they have been characterized by the fact that they are bulky and complicated. Therefore, they are not only difficult to handle and install but are also expensive and difficult to service.

Further, radio telephone systems presently known do not include means which would enable a person using one of the mobile units to know that there is another call waiting at the base station so that he can terminate the call that he is making.

Generally, the invention relates to a radio telephone communications system comprising at least first and second radio telephone stations. The first station has a transmitter which transmits at a first radio frequency for transmitting information from the first station to the second station. It has a receiver for receiving information on a second frequency. The second station also has a transmitter and a receiver. The transmitter transmits at the second predetermined radio frequency to transmit information to the first station. The receiver is for receiving information on the first frequency. Means are provided for dividing the first and second frequencies into a plurality of segments. Some of the segments are channels for transmitting information, and some of the segments are between the information transmitting channels.

One of the information transmitting channels in each of the first and second frequencies transmits information between the first and second stations.

Additionally, the invention generally relates to a radio telephone communications system of the type described in which means are provided for alerting a user of one of the stations that another caller is attempting to communicate with the staton while it is in use.

For the purpose of illustrating the invention, the drawing shows a form which is presently preferred; it being understood, however, that this invention is not limited to the precise arrangements and instrumentalities shown and wherein.

Figure 1:
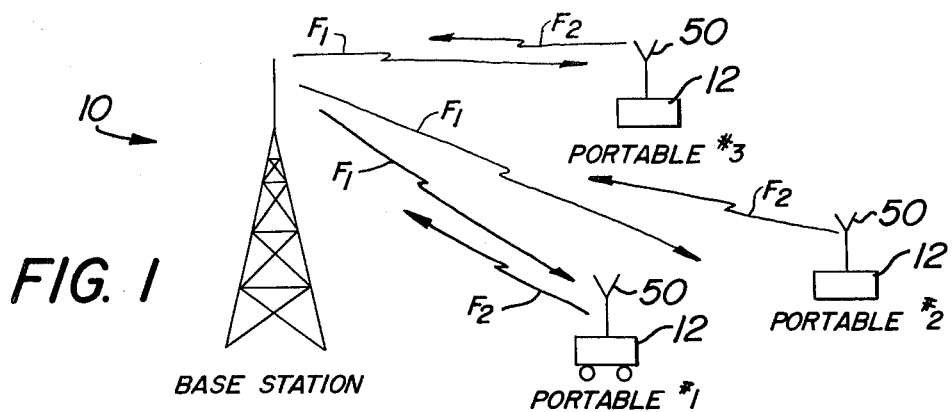
FIG. 1 is a schematic representation of a radio telephone communications system employing the present invention.

As best seen in FIG. 1 the system comprises a base station 10 and a plurality of portable stations 12. The portable stations may be hand carried, or on vehicles, or may even be stationary without affecting the manner in which they are employed in this invention. While only three such portable stations 12 are shown, it is apparent that many such stations 12 can be associated with a particular base station subject to the limitations mentioned above.

The present invention uses two radio frequencies F1 and F2 as the carriers of information between the base station and all of the portable stations 12. While radio frequencies are the presently preferred carriers for information, it is within the scope of this invention to use any other frequency medium in the electromagnetic spectrum which can be time division multiplexed and which can convey information or any other suitable medium.

In FIG. 1 frequency F1 is used to transmit information from the base station 10 to all of the portable units 12. Frequency F2 is used to transmit information from all of the portable units to the base station. Both frequencies are multiplexed so that a number of separate communication channels can be established on each of them. Further, the channels on F1 and F2 are paired so that a channel on F1 and a channel on F2 are used to complete a communication link between the base station 10 and any of the portable units 12.

Figure 2:
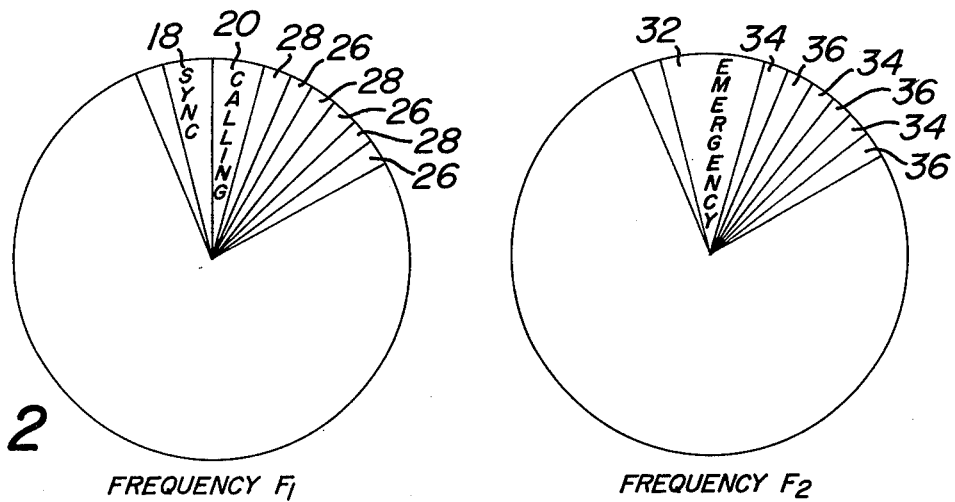
FIG. 2 is a schematic representation of a time division multiplexing cycle for two radio frequencies.

In FIG. 2 each of the frequencies F1 and F2 is represented as a circle. The circles are divided into a plurality of sectors with each sector representing a particular time interval of the multiplex cycle.

The sectors serve as communications channels for each of the frequencies and therefore they will be referred to as channels.

Frequency F1 includes a channel 18 on which synchronizing signals can be sent from the base station 10 to the portable stations. Channel 20 is used to send calling signals from the base station 10 to the portable units. Although all of the portable units will receive all of the calling signals sent on this channel, it will be clear from what follows herein that each portable unit will respond only to its calling signal when it is being sent on channel 20. The remainder of the cycle of F1 can be divided into a plurality of communication channels 26 which are separated by guard bands 28.

Frequency F2 includes a channel 32 on which emergency communication can be transmitted to the base station. This channel is common to all portable units. Thus a transmission on this channel would not be private. However, this sector could be divided as previously described. The remainder of the cycle is divided into a plurality of communication channels 34 which are separated by guard bands 36.

The guard bands 28 and 36 are used to prevent interference or cross talk between portable units 12 which are using adjacent channels or which might occur as a result of the different portable units being at varying distances from the base station 10.

If the time period of the multiplexing cycle is considered as being 360° and 50 channels are to be used for communication then each channel 26 and 34 and its associated guard bands 28 and 36 will occupy 6°. The remaining 60° is used for the synchronizing and calling signals 18 and 20 on F1 and the emergency channel or channels on F2. Preferably, each of the guard bands occupy the equivalent of 1° in the cycle. Therefore the net width of each of the communication channels will be 4°.

The channels, in this example, could be numbered from one to 50.

As explained earlier, each of the channels on frequency F1 will be paired with a channel on frequency F2 so that the base station can transmit information to a mobile unit on that channel and can receive information on a channel on frequency F2. The channels on F1 and F2 comprising the communications link between the base station 10 and any of the portable units 12 are called duplex channels. These duplex channels are offset from each other in time to avoid howling during transmission.

Thus, in the system which has been generally described there are 50 duplex channels; each consisting of two frequencies F1 and F2; one of the frequencies being for transmission and the other for receiving.

In the presently preferred form of the invention, the duplex channels are not assigned to particular portable units. Instead, they are all available for use on a demand basis provided they are not already in use. This means that transmission will be made on any available duplex channel. Therefore, there can be many more portable units than duplex channels, since it is unlikely that all of the portable units will be in use at the same time.

Figure 3:
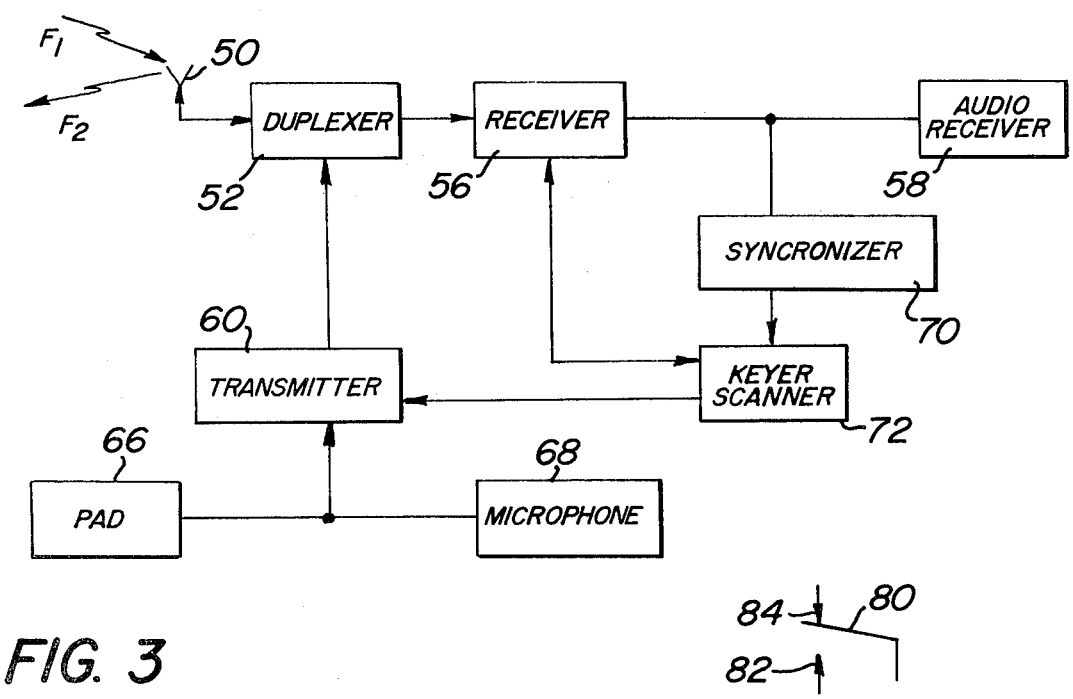
FIG. 3 is a schematic representation of a typical portable station of the type used in the radio telephone system.

Referring now to FIG. 3, it can be seen that each of the portable units include an antenna 50 connected to a duplexer 52. The duplexer is connected to a receiver 56. The receiver 56 is connected to an audio receiver 58. The duplexer is also connected to a transmitter 60 which receives information from a push button dialing device 66 and by way of a microphone 68.

A synchronizer 70 is connected to the output of receiver 56. The output of the synchronizer is connected to a device which is characterized as a "keyer-scanner" and which is indicated schematically by numeral 72. The keyer-scanner 72 is also connected to the receiver 56 and the transmitter 60.

As seen in FIG. 3, frequency F1 which is transmitted by the base station 10 will send the above-mentioned synchronizing signal 18 to all of the portable units 12. Each portable unit will receive this signal on its receiver 56 which is normally on and use it to energize its transmitter 60 so that information can be sent from the portable station on frequency F2, and be received by that station on frequency F1.

The synchronizing pulses 18 from the base station 10 pass through the duplexer 52 and receiver 56 to a synchronizer 70. The synchronizer 70 sends synchronizing pulses to the keyer-scanner 72. As will be more fully explained herein, the keyer-scanner 72 comprises a scanning member for searching for channels which are available for communication of information between the base station and the portable unit and a keying member for selecting available channels for the transmission and reception of information on frequencies F1 and F2 by selectively energizing the receiver 56 and energizing the transmitter 60.

Thus, the operator of the portable unit hears communications through audio receiver 58. He speaks through microphone 68 which is connected to the transmitter 60. The mobile unit operator places his calls by use of the dial or button pad 66.

The portable transmitter 60 and receiver 56 are used for transmitting and receiving of communications in duplex. However, the receiver is only energized during the time that the specific channel assignment time occurs and during the time that synchronizing and calling signals occur. It is inoperative at all other times. The transmitter is only energized during the time that the specific channel assignment time occurs. It is inoperative at all other times. In a dormant mode, such as when the portable unit is not in use and not being called, the transmitter is de-energized and the receiver is turned on only during the synchronizing and calling time periods of the multiplexing cycle.

The system may be in a quiescent or "on hook" state with switch arm 80 in engagement with contact 82 while in this state the receiver 56 is energized and it can receive synchronizing and calling signals from the base station 10.

Also, it may be in an active or "off hook" state with switch arm 80 in engagement with contact 84. While in this state it is ready to call the base station or has answered a call from the base station.

When the portable unit is "on hook" and it is called by the base station, a tone code which identifies a particular portable unit is transmitted on frequency F1. This energizes the called portable unit which, by virtue of its keyer-scanner, now scans for and seizes an unused channel on frequency F1. When an unused channel on frequency F1 is seized the transmitter 60 is energized. It transmits on frequency F2. It automatically transmits a matrix tone code which identifies the portable unit completing channel seizure. The base station acknowledges receipt of the matrix tone code from the portable unit on frequency F1 by sending a tone code which causes a signalling device such as a bell, buzzer or light at the portable unit to be activated so that the operator of the portable unit will know that it is being called.

On the other hand, when the portable unit operator wants to initiate a call, the unit is placed in an "off hook" configuration.

This causes the portable unit to seize an unused duplex channel and to energize its transmitter 60. An identifying tone code which is assigned to the portable unit is then transmitted automatically to the base station. The base station acknowledges the identification of the portable unit by sending back a dial tone on that channel. The operator of the portable unit now dials the telephone number wanted (an outgoing call).

Upon completion of a call the portable unit signals an "on hook" condition which transmits a particular matrix tone code on frequency F2 which signals the end of transmission and the portable transmitter 60 and receiver 56 are returned to the dormant mode.

Figure 4:
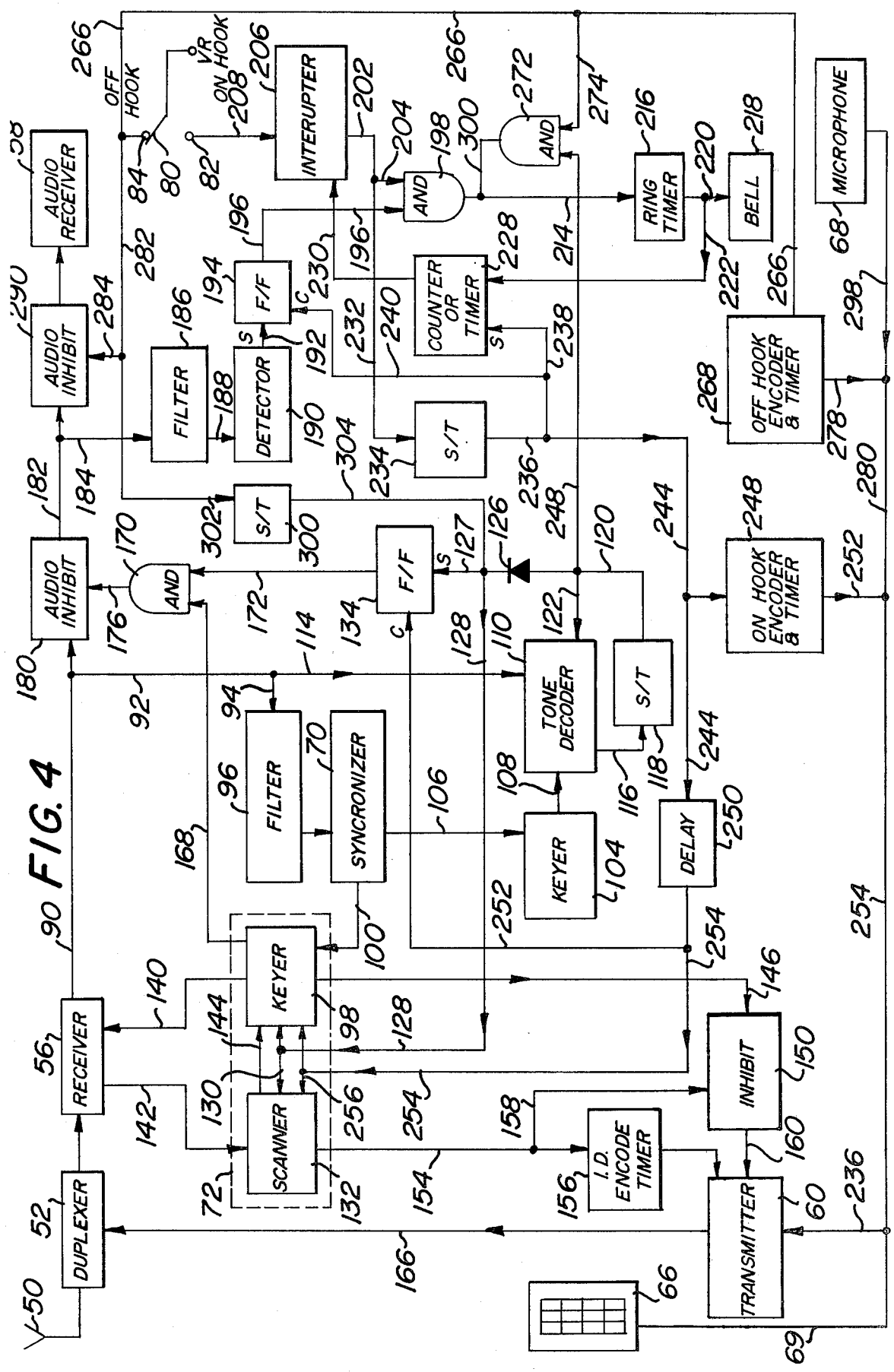
FIG. 4 is a detailed schematic drawing of the portable station shown in FIG. 3.

By referring to FIG. 4, a detailed explanation of the operation of the portable unit will be explained.

MOBILE UNIT "ON HOOK"

When the system is "on hook", the synchronizing signal 18 is sent by the base station to all of the portable units 12 which are part of the system. In this regard, the following description is true with respect to what is happening at all mobile units 12 in the system.

Signal 18 is intercepted by antenna 50 and passed through duplexer 52, receiver 56 and through lines 90, 92 and 94 to filter 96. The filter 96 permits only the synchronizing signal 18 to pass to synchronizer 70.

The pulse 18 from synchronizer 70 is applied to keyer 98 by line 100 and to keyer 104 by line 106 once in each multiplexing cycle. Keyer 98 de-energizes the receiver except when synchronization pulses 18 and calling signals 20 are to be received.

The keyer 104 generates signal over line 108 which causes tone decoder 110 to be enabled to detect a matrix tone code only during that portion of the multiplying cycle (FIG. 2) which corresponds to calling sector 20. The tone decoder 110 can only recognize and respond to the particular code assigned to the portable unit of which it is a part.

Therefore, while the mobile units 12 are in their "on hook" configurations, they will all receive the synchronizing pulses 18 generated by the base station 10. This pulse selectively energizes the keyer 98 and the tone decoder 15 in each mobile unit.

BASE STATION CALLING MOBILE UNIT

The base station 10 calls a particular mobile unit 12 by transmitting to all mobile units the matrix tone code for the particular mobile unit that is desired. The matrix tone code will be received by all the mobile units and be passed through their receiver 56, lines 90, 92 and 114 to their tone decoders 110. The matrix tone code is prevented from entering the synchronizer by filter 96.

Only the tone decoder 110 in the particular mobile unit called will respond to the transmitted matrix tone code. In all other mobile units nothing will happen. The response of the tone decoder 110 comprises a pulse sent over line 116 to a suitable monostable multivibrator such as Schmidt trigger 118.

The pulse generated by the Schmidt trigger resets the tone decoder 110 by way of lines 120 and 122. The pulse also passes through diode 126 and lines 128 and 130 to the keyer 98 and scanner 132. In addition, the pulse passes through the diode 126 to set flip-flop 134 on line 127.

The signal on lines 128 and 130 causes the keyer to seize a predetermined multiplex channel on which to establish a communication link. It does this by sending a signal to receiver 56 on line 140 which then energizes the receiver except during that period of the multiplex cycle that corresponds to the time period during which the receiver will be able to receive information on one of the channels 26 and during synchronizing and calling periods 18 and 20 on frequency F1. The particular channel 26 on which information will be received is selected by cooperation between the keyer 98 and the scanner 132 in the following manner.

As keyer 98 energizes the receiver 56 on line 140, scanner 132 monitors the output of the receiver 56 on line 142. If the scanner detects that the first channel 26 that was selected is already in use, it will send a command on line 144 to the keyer 98 to select the next channel in the cycle.

At the same time that keyer 98 is trying to find an available channel on which receiver 56 will be able to establish communications it is also sending signals on line 146 through the inhibit circuit 150 to the transmitter 60. However, the signals are blocked by the inhibit circuit because it is normally in a blocking configuration. This process continues until the scanner 132 detects a channel which is not being used.

At this point the scanner 132 sends a signal on line 154 to energize I.D. Encode Timer 156 and on line 158 to disable inhibit circuit 150. When inhibit circuit 150 is disabled it will energize the transmitter by line 160 during the portion of the multiplexing cycle that the scanner 132 has found to be available.

At the same time I.D. Encode timer 156 will begin to transmit a matrix tone code which identifies the particular portable unit responding. This matrix tone code is conveyed by line 166 to the duplexer and then to the antenna 50.

The base station will compare the tone code is received from the portable unit with the tone code of the unit it has called in a well known manner. If it identifies the mobile unit as the one that it has called, a duplex channel between the base station and the mobile unit is established.

Further, once an available duplex channel is located, keyer 98 will send a pulse each time that channel occurs along line 168 to one of the inputs of AND gate 170.

As explained earlier, flip-flop 134 in the called mobile unit is set when that unit recognizes its own tone code. The set flip-flop 134 sends a signal to the other input of AND gate 170 along line 172. Therefore AND gate 170 will have an output each time it is energized along line 168 or once each multiplex cycle.

The output of AND gate 170 is connected by line 176 to audio inhibit circuit 180. The audio inhibit circuit is normally in a state in which it blocks signals. But when audio inhibit circuit 180 is energized each time there is an output from AND gate 170 it will pass the signal that is on line 90.

Finally, upon recognition of the portable unit as the one that it has called, the base station 12 transmits on frequency F1 a ring tone code on the channel that has been seized. This may be the same ring tone code that will be sent to any of the portable units. However, since it is being sent on a particular duplex channel, only the called portable unit can respond to it.

RINGING

The ring tone code will cause an indication, such as ringing, buzzing or a flashing light at the portable unit that is being called to alert the operator that there is an incoming call. This occurs in the following manner.

The ring tone code enters antenna 50, passes through duplexer 52, receiver 56, line 90, inhibit 182, line 184, through filter 186. The filter 186 will not pass any signal except the ring tone code.

The signal from the filter 186 passes on line 188 to a suitable detector 190. The detector, in response to an input on line 188 sets flip-flop 194 by way of line 192 which in turn sends a signal by way of line 196 to one of the inputs of AND gate 198.

The other input of AND gate 198 already has a signal applied to it on lines 202 and 204 since the mobile unit is "on hook". That signal is applied through interrupter switch 206 by way of line 208.

The interrupter switch 206 has an output on line 202 when the switch arm 80 engages contact 82 thereby permitting the interrupter to pass a signal corresponding to the voltage $V_R$ on line 208.

The output from AND gate 198 travels by way of line 214 to ring timer 216 which then actuates the bell 218 by way of line 220 for a series of predetermined intervals or a predetermined time to alert the portable unit that it is being called.

NO ANSWER

If after a predetermined number of pulses from ring timer 216, for example, 7 pulses or an equivalent time period, the mobile unit will be reset to its dormant mode.

This occurs since each ring of bell 218 or pulse from ring timer 216 passes over line 222 to a resettable counter 228. The counter 228, which has already been set, counts the number of pulses that it receives over lines 222. If it counts the predetermined number of pulses it sends a signal to interrupter 206, on line 230. The interrupter switch is then opened and then closed. When it is opened, it breaks the circuit from $V_R$ and de-energizes AND gate 198 so that ring timer 216 is de-energized to stop the bell from ringing.

Alternately, the counter could be replaced by a timer which is set by line 238 and which is activated by line 222. The period during which the timer permits interrupter switch 206 to energize input 204 of AND gate 198 can be set to any convenient time period.

When the interrupter switch closes, a signal is sent on line 232 to a suitable monostable multivibrator such as Schmidt trigger 234 which then sends a pulse along lines 236 and 238 to reset the counter 228. The pulse also goes by way of line 240 to clear flip-flop 194 and de-energize AND gate 198 which deactivates the ring timer 216 and bell 218.

The Schmidt trigger also sends a pulse over line 236 and 244 to "on hook" encoder and timer 248 and delay 250. The "on hook" encoder and timer generates a matrix tone code for a predetermined time which goes over lines 252 and 254 to the transmitter 60 and then by way of line 166 to the duplexer and antenna which signals the base station 10 that the call has bee unanswered and that the portable unit is releasing the seized channel.

The delay 250 which is triggered by the pulse from the Schmidt trigger 234 permits the on hook tone code to be transmitted, then it sends a signal by way of line 252 to clear flip-flop 134 which in turn de-energizes AND gate 170 and activates inhibit 180. The same signal passes over lines 254 and 256 to both the keyer 98 and the scanner 132.

This causes them to return to their dormant states whereby the keyer releases the seized duplex channel. Further, since no signals are now being generated on lines 140, 146 and 168, the receiver now reverts to the dormant mode that it was in before the unit was called. Also, the scanner de-energizes inhibit circuit 150 which shuts down transmitter 60, and the input to AND gate 170 on line 168 is removed.

PORTABLE UNIT GOES "OFF HOOK"

If the portable unit is "answered" an "off hook" condition exists and an off hook signal is sent to the base station after which the portable unit is connected with the calling party. When the conversation is ended the portable unit signals "on hook" and the transmitter 60 and receiver 56 are returned to the dormant mode.

The portable unit answers an incoming call by displacing switch arm 82 to the "off hook" position where it engages contact 84. This removes the voltage $V_R$ from contact 82 and applies it to contact 84.

Removal of voltage $V_R$ from the interrupter switch 206 deenergizes AND gate 198 and thus disables the ring timer 216 and bell 218.

The signal corresponding to voltage $V_R$ is now applied by way of contact 84 and line 266 to off-hook encoder timer 268, and to the input of AND gate 272 by way of line 274.

The off hook encoder timer 268 generates a matrix tone code for a predetermined period of time indicating an off hook condition. This tone code travels by way of lines 278, 280 and 254 and 236 to the transmitter 60 which then transmits this code to the base station 10 by way of the duplexer 52 and antenna 50 on the seized duplex channel.

The signal is also applied by way of contact 84 and lines 282 and 284 to audio inhibit 290 which now permits all signals that pass through audio inhibit 180 to pass to the audio receiver 58. A signal is also sent to Schmidt trigger 300 by way of line 302. This causes the Schmidt trigger to send a pulse setting the flip-flop 134. But since that flip flop is already set nothing happens.

Further, the signal is blocked from entering AND gate 272 by way of lines 304 and 248 by diode 126. If the signal were to reach AND gate 272 via that route, the alarm would be energized or the tone decoder might be disrupted while receiving an incoming call.

Additionally, this signal goes to the keyer 98 and the scanner 132 by way of lines 304, 128 and 130, but since they have already been activated, no further action occurs.

The base station, receiving an "off hook" tone code signal now completes the connection between the calling party and the portable unit 12.

Outgoing data or voice communications is sent from microphone 68 over lines 298, 280, 254 and 236 to transmitter 60, where it is put on the particular seized channel, sent over line 166, through duplexer 52 and out antenna 50 to the base station.

Incoming data or voice communications is received by antenna 50 and goes through duplexer 52 through receiver 56 over line 90, through audio inhibit 180 which is turned on only during the time period assigned to the channel seized which contains the incoming communication which now goes over line 182, through audio inhibit 290 to audio receiver 58.

CALL WAITING

If, after a duplex communication channel has been established between the party calling through the base station and the portable unit, i.e., a conversation is taking place, the base station can advise the portable unit that it is holding another call.

This is accomplished when the tone code of the portable unit is transmitted from the base station. It is received by the portable unit during the calling period of the multiplex cycle and passes through receiver 56. It cannot pass through audio inhibit 180 since that element only passes signals during the time period allotted to the seized channel. However, it does go to the tone decoder 110. If the tone code received is not for this particular portable unit, no further actions occur. If it is for this particular portable unit, a pulse is sent over line 116 to Schmidt trigger 118 which resets the tone decoder by way of lines 120 and 122. It also passes over lines 120 and 127 to flip-flop 134 and to the keyer 98 and scanner 132 by way of lines 128 and 130. However, since these elements are still energized no further action occurs. The pulse also passes over line 248 to one of the inputs of AND gate 272.

The other input to AND gate 272 is the signal corresponding to $V_R$ which was applied when the portable unit went "off hook". Thus, the AND gate 272 will have an output when the Schmidt trigger 118 fires its pulse. The output will pass on line 300 through ring timer 216 thereby activating bell 218 for the duration of the pulse from the Schmidt trigger thus alerting the portable unit that a second caller exists.

It should be appreciated that the output of AND gate 272 could be connected directly to the bell since the purpose of ring timer 216 is merely to ring the bell for a predetermined interval or intervals. Thus since the interval is measured by the duration of the pulse from the Schmidt trigger 118 this alternative arrangement becomes feasible.

PORTABLE UNIT GOES "ON HOOK"

When the portable unit hangs up, switch arm 80 returns to contact 82. This removes $V_R$ from contact 84 which de-energizes audio inhibit 290. Contact of switch arm 80 with contact 82 applies the signal corresponding to $V_R$ to interrupter switch 206 which passes the signal by way of lines 202 and 204 to one input of AND gate 198. The signal also passes by way of line 202 and 232 to Schmidt trigger 234 which generates a pulse which clears flip-flop 194, resets counter 228 and signals the on hook encoder and timer 248 and delay 250 to return the portable unit to its dormant mode all as explained earlier.

If the portable unit went on hook because of the call waiting signal, the unit can now go through the previously described process to receive that call.

PORTABLE UNIT CALLING BASE STATION

To make a call the portable unit goes off hook. This applies $V_R$ to contact 84, and then by way of line 266 to the off hook encoder and timer 266. $V_R$ is also applied to audio inhibit 290 by way of lines 282 and 284 and to a suitable monostable multivibrator such as Schmidt trigger 300 by way of line 302. The Schmidt trigger 300 sends a signal on line 304 to set flip-flop 134, and also sends a signal on line 128 to energize the keyer 98 and scanner 132. The keyer and scanner cooperate to seize to duplex channel and energize the I.D. encode timer 156 and inhibit 150 to identify the portable unit to the base station, all as explained earlier.

The pulse from Schmidt trigger 300 is prevented by diode 126 from disrupting the tone decoder 110 which may possibly be receiving an incoming call or from energizing AND gate 272 which would cause the ring timer 216 to activate the bell 218.

The flip-flop 134 energizes one of the inputs to AND gate 170. Hence this gate and audio inhibit 180 will be energized to pass signals each time the gate receives a pulse on line 168.

The off hook encoder and timer also sends a tone code to the transmitter. However, this has no effect since it may be sent prior to the time that the keyer and scanner have seized a duplex channel or even if such a duplex channel has been seized, the base station will ignore the tone code since it will not be looking for it and hence cannot use it if it is received.

Once the duplex channel is seized and the portable unit has been identified by the signal sent by the I.D. encoder and timer the base station will transmit a dial tone over the seized channel signalling the operator of the portable unit that said operator may proceed to dial. Dialing is accomplished by means of a touch tone pad 66 which generates a tone code over lines 310 and 236 into transmitter 60 over line 166 through duplexer 52 and antenna 50 to the base station.

After the number is dialed and communication established, audio signals are transmitted from the microphone 68 over lines 298, 280, 254 and 236 to the transmitter. Audio signals are received from the antenna and duplexer, through line 90, now enabled audio inhibit 180, lines 182 and now enabled audio inhibit 290 to audio receiver 58.

After the communication is terminated, the portable unit operator places the unit on hook and it will go into its dormant mode as explained earlier.

Thus, while what has been described as a radio telephone system comprising a particular arrangement of components which achieves the desired result, it is apparent that many other arrangements and components could be employed to accomplish the desired result. Thus, the scope of this invention should not be measured by the foregoing detailed description, but rather by the scope of the claims appended hereto.

I claim:

1. In a two frequency time division multiplexed radio telephone system that includes a base station that transmits information on one of said frequencies and receives information on the other of said frequencies, and plurality of portable units that receive information on said one frequency and transmit information on the other of said frequencies and both of said frequencies are divided into a plurality of channels and each of said portable units includes a means for detecting a calling signal which has been assigned to it, the improvement comprising, each of said portable units including means for indicating that it is being called by the base station, said indicating means including an alarm means for alerting the operator of said portable unit that it is being called, said alarm means including a switch which is normally in a first position and a gate, said switch being operative to normally apply a first predetermined signal to said gate, means for applying a second predetermined signal to said gate when said portable unit detects that it is being called, said alarm means further including an energizable alarm and a ring timer, and said alarm is energized for a predetermined number of intervals by said ring timer when both of said signals are applied to said gate at the same time, and said alarm is deenergized when said switch is moved to a second position.

2. A system as defined in claim 1 including means for removing said first predetermined signal from said gate after said predetermined number of intervals.

3. A system as defined in claim 2 wherein said means for removing said first predetermined signal includes a means for counting the number of said intervals and a means for opening a normally closed circuit element between said gate and said switch which is operative to apply said first predetermined signal, and said counting means is coupled to said normally closed element for opening the same after said predetermined number of intervals.

4. A system as defined in claim 1 wherein said means for applying said second signal to said gate comprises a one shot which is coupled to bistable means, said bistable means being switchable from a first state to a second state in which it is operative to apply said signal, and said one shot is operative to switch said bistable means to its second state when said portable unit detects that it is being called.

5. A system as defined in claim 4 wherein said bistable means includes first and second bistable elements, and a signal from said first bistable element is operative to enable said second bistable element to shift from one of its states to the other so that it applies said second signal to said gate.

6. A system as defined in claim 1 including a second gate, said second gate having an output that is coupled to said alarm, means for applying the first predetermined signal to said second gate when said switch is in said second position, and means for applying said second predetermined signal to said second gate so that said alarm will be energized when both of said predetermined signals are applied to said second gate, and said last named means comprises said means for detecting a calling signal which has been assigned to said portable unit, and means for generating a signal when said portable unit detects that it is being called.

7. A system as defined in claim 6 wherein the normal position of said switch corresponds to said portable unit being in a passive state in which it can be called by said base station, said second position of said switch corresponds to said portable unit being in an active state in which there is communication between said portable station and said base station, and said second gate, said second signal and said second predetermined signal are operative when said portable unit is in its active state to alert said portable unit that it is being called by said base station.

8. A system as defined in claim 5 wherein said system includes first and second means for inhibiting the transmission of an information signal, said first bistable element being coupled to said first inhibiting means to enable it to pass an information signal when the time period that corresponds to the channel on which the portable unit is communicating with the base station occurs, said signal that passes through said first inhibiting means being coupled to said second bistable element to shift and second bistable element to said other state, and displacement of said switch to said second position enables said second inhibiting means to pass said information signal.

9. A system as defined in claim 1 wherein each of said portable units includes a transmitter, a receiver, means for scanning each of said channels to detect a channel which is not being used, and means for seizing an unused channel, said seizing means being coupled to said transmitter and to said receiver for enabling them to transmit and receive during at least the portion of the multiplex cycle corresponding to said seized channel, said scanning means being coupled to said seizing means for causing said seizing means to search for the channel that is seized, and means for retaining said transmitter de-energized except during at least said seized channel.

10. In a multichannel, duplex, radio telephone system that includes a base station and a plurality of units that are in communication with the base station wherein each of said units is assigned an identification tone code and includes a transmitter and a first receiver for transmitting and receiving tone and audio signals respectively and a duplexer coupled to the transmitter and to the first receiver for permitting simultaneous transmission and reception of the identification tone code and audio signals and a second receiver coupled to said first receiver to receive audio signals, the improvement comprising a scanner coupled to said first receiver for detecting an available channel on which to receive said signals from said base station; means coupled to said first receiver for seizing said available channel; synchronizing means; a tone decoder, said tone decoder being responsive to the particular identification tone code assigned to the particular unit; said synchronizing means being coupled between said first receiver and said tone decoder for selectively enabling said tone decoder to detect a calling tone code from said base station in response to a synchronizing signal from said base station; said scanner and said seizing means being coupled to each other and to said tone decoder so that when said tone decoder recognizes its particular identification tone code, said scanner monitors the output of said first receiver and causes said seizing means to selectively seize channels for monitoring by said scanner until said scanner detects a channel which is not being used for communication from the base station to the unit being called; means for normally inhibiting said second receiver, said inhibiting means being coupled to said tone decoder and said seizing means and being disabled in response to signals from said tone decoder and said seizing means to enable said second receiver to receive audio signals from said first receiver; means for inhibiting said transmitter coupled between said transmitter and said seizing means, and said scanner is operative to disable said inhibiting means when a communication channel is detected to permit the identification tone code of the unit to be sent through said transmitter to the base station.

11. A system as defined in claim 10 including first and second audio inhibit means coupled to each other between said first and second receivers; an energizable alarm for indicating to a person that the unit is being called by the base station; means coupled to said alarm for de-energizing it after a predetermined interval; a switch coupled between said energizable alarm and said second audio inhibit for selectively enabling said second audio inhibit to transmit audio signals to said second receiver and de-energizing said alarm; a gate coupled to said first audio inhibit; a bistable element coupled to said tone decoder and applying a first signal to said gate when said tone decoder recognizes its particular tone code; said seizing means being coupled to said gate and applying a second signal to said gate when channel seizure occurs, and said gate enables said first audio inhibit to pass a signal to energize said alarm when said first and second signals are applied to said gate.

12. A system as defined in claim 10 wherein said first receiver is coupled to said synchronizer and to said tone decoder, and a filter connected between said synchronizer and said first receiver for enabling only synchronizing signals from said receiver to enter said synchronizer.

13. A system as defined in claim 11 wherein said tone decoder is resetable, a one-shot coupled to said tone decoder and to said bistable element, and said one-shot is operative to cause said bistable element to apply said first signal and said tone decoder to reset after said tone decoder recognizes its particular tone code and energizes said one-shot.

14. A system as defined in claim 10 wherein said means for sending the identification tone code includes a means for sending a signal identifying the particular unit and said signal sending means is coupled between said scanner and said transmitter.

* * * * *